(12) United States Patent
Ross et al.

(10) Patent No.: US 11,763,263 B1
(45) Date of Patent: Sep. 19, 2023

(54) SYSTEMS AND METHODS FOR IDENTIFYING AND RANKING SUCCESSFUL AGENTS BASED ON DATA ANALYTICS

(71) Applicant: MASSACHUSETTS MUTUAL LIFE INSURANCE COMPANY, Springfield, MA (US)

(72) Inventors: Gareth Ross, Amherst, MA (US); Tricia Walker, East Hampton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 454 days.

(21) Appl. No.: 16/391,018

(22) Filed: Apr. 22, 2019

Related U.S. Application Data (63) Continuation of application No. 15/399,458, filed on Jan. 5, 2017, now Pat. No. 10,325,243, which is a continuation of application No. 14/576,900, filed on Dec. 19, 2014, now Pat. No. 9,542,452.

(60) Provisional application No. 61/922,127, filed on Dec. 31, 2013, provisional application No. 61/921,732, filed on Dec. 30, 2013.

(51) Int. Cl.
*G06Q 10/1053* (2023.01)
*G06F 16/2457* (2019.01)
*G06Q 10/0639* (2023.01)
*G06Q 10/10* (2023.01)
*G06Q 10/06* (2023.01)

(52) U.S. Cl.
CPC ..... *G06Q 10/1053* (2013.01); *G06F 16/24578* (2019.01); *G06Q 10/06398* (2013.01)

(58) Field of Classification Search
CPC .............. G06Q 10/1053; G06F 16/24578; G06Q 10/06398
See application file for complete search history.

(56) References Cited

U.S. PATENT DOCUMENTS

| | | | | |
|---|---|---|---|---|
| 5,551,880 A * | 9/1996 | Bonnstetter et al. | ... | G06Q 99/00 434/236 |
| 8,601,054 B2* | 12/2013 | Bagwell et al. | ....... | G06F 16/33 709/204 |
| 9,245,257 B2 | 1/2016 | McConnell | | |
| 9,542,452 B1 | 1/2017 | Ross et al. | | |
| 2001/0034011 A1 | 10/2001 | Bouchard | | |
| 2002/0128892 A1* | 9/2002 | Farenden | ............... | G06Q 10/10 705/7.14 |
| 2003/0071852 A1* | 4/2003 | Stimac | ................. | G06Q 10/10 715/810 |
| 2003/0105642 A1 | 6/2003 | Andino, Jr. et al. | | |

(Continued)

FOREIGN PATENT DOCUMENTS

WO 2013165923 A1* 11/2013 ................. G06Q 50/01

OTHER PUBLICATIONS

Taleo Enterprise, "Taleo Recruiting User Guide", dated Jul. 25, 2011 (268 pages).

*Primary Examiner* — Cheyne D Ly
(74) *Attorney, Agent, or Firm* — Foley & Lardner LLP

(57) ABSTRACT

A system and a method for identifying and ranking agents are disclosed herein. The system includes an analytics engine which retrieves information from external and internal databases. The analytics engine uses the information retrieved from these databases, in addition to one or more success factors or key attributes, to identify and rank prospective agents. The analytics engine can also match one or more prospective agents with a general agent and provide ranking and performance assessment reports for evaluating and following up on the agent's career development.

19 Claims, 5 Drawing Sheets

(56) References Cited

U.S. PATENT DOCUMENTS

| | | |
|---|---|---|
| 2003/0177045 A1 | 9/2003 | Fitzgerald et al. |
| 2004/0054553 A1 | 3/2004 | Zizzamia et al. |
| 2004/0088177 A1 | 5/2004 | Travis et al. |
| 2006/0020509 A1 | 1/2006 | Strain et al. |
| 2006/0053046 A1 | 3/2006 | Bonnstetter et al. |
| 2006/0233346 A1 | 10/2006 | McIlwaine et al. |
| 2006/0277056 A1* | 12/2006 | Broberg ............... G06Q 10/10 705/321 |
| 2008/0208777 A1 | 8/2008 | Stephens |
| 2009/0006173 A1 | 1/2009 | Farrell et al. |
| 2009/0006178 A1* | 1/2009 | Taylor et al. ...... G06Q 30/0203 705/7.32 |
| 2009/0043621 A1* | 2/2009 | Kershaw ......... G06Q 10/06398 705/7.16 |
| 2010/0312605 A1 | 12/2010 | Mitchell et al. |
| 2012/0123957 A1* | 5/2012 | Coleman ........... G06Q 10/1053 705/321 |
| 2012/0245963 A1 | 9/2012 | Peak et al. |
| 2013/0085805 A1 | 4/2013 | Kursar et al. |
| 2013/0132360 A1 | 5/2013 | Kuznetsov et al. |
| 2013/0243179 A1* | 9/2013 | Thomson et al. ... H04M 3/5175 379/265.12 |
| 2013/0246294 A1* | 9/2013 | Pendyala et al. .. G06Q 10/1053 705/321 |
| 2013/0268451 A1* | 10/2013 | Pendyala et al. .. G06Q 10/1053 705/321 |
| 2013/0290206 A1* | 10/2013 | Desai et al. ... G06Q 10/063112 705/321 |
| 2013/0290210 A1 | 10/2013 | Cline et al. |
| 2013/0325734 A1* | 12/2013 | Bixler et al. ....... G06Q 10/1053 705/321 |
| 2013/0326375 A1 | 12/2013 | Barak et al. |
| 2014/0081883 A1* | 3/2014 | Hartman et al. ....... G06Q 10/10 705/321 |
| 2015/0379453 A1 | 12/2015 | Myers |
| 2016/0132831 A1* | 5/2016 | Sharma et al. ..... G06Q 10/1053 705/321 |
| 2016/0335600 A1* | 11/2016 | Jain et al. .......... G06Q 10/1053 |

\* cited by examiner

SYSTEMS AND METHODS FOR IDENTIFYING AND RANKING SUCCESSFUL AGENTS BASED ON DATA ANALYTICS

CROSS-REFERENCE TO RELATED APPLICATIONS

This application is a continuation application of U.S. Pat. Application Serial No. 15/399,458, filed Jan. 5, 2017, which is a continuation application of U.S. Pat. Application Serial No. 14/576,900, filed Dec. 19, 2014, which claims priority to U.S. Provisional Pat. Application Serial No. 61/922,127, filed Dec. 31, 2013, and U.S. Provisional Pat. Application Serial No. 61/921,732, filed Dec. 30, 2013, which are hereby incorporated by reference in their entirety.

This application relates to U.S. Provisional Pat. Application Serial No. 61/921,718, filed on Dec. 30, 2013, and U.S. Provisional Pat. Application Serial No. 61/921,725, filed Dec. 30, 2013, which are hereby incorporated by reference in their entirety.

FIELD OF THE DISCLOSURE

The present disclosure relates in general to systems and methods for career management and more specifically, to a method for identifying and ranking successful agents based on data analytics.

BACKGROUND

Insurance or financial companies usually spend significant amounts of time and resources in developing agents' careers. For example, considering the cost of attrition, developing successful agents may include costs of in the excess of about $300k over a span of at least 2 to 5 years.

For the foregoing reasons, there is a need for a system and method that identify and rank successful agents, provide support in the recruitment process, and assist in the career development of the agents.

SUMMARY

A system and a method for identifying prospective agents are disclosed herein. Embodiments of the system and method use one or more success factors or key attributes to identify and rank successful agents, therefore improving the development and likelihood of success of agents.

In one embodiment, a computer-implemented system for identifying successful agents includes an external database and an internal database operatively coupled with an analytics engine. In this embodiment, the analytics engine includes a profile analyzer module and a predictive identification module, among other software modules. The analytics engine is operatively coupled with an attributes analyzer. Attributes analyzer may feed key attributes into the analytics engine to identify and rank prospective agents.

In an embodiment, a computer-implemented method for predicting successful agents includes the following steps: of retrieving and extracting data from one or more external and internal databases, deriving one or more success factors or key attributes of successful agents, transforming data into agents' profiles, analyzing agents' profiles, assigning validation scores to attributes within agents' profiles, associating a weighted coefficient to agents' profiles and generating a list of one or more prospective agents.

In an embodiment, a computed implemented method for providing prospective agents to general agents includes the following steps: obtaining successful agents' profile and ranking successful agents. If the agent is an active agent, then the system performs an assessment of the agent's profile. Otherwise, the system matches the prospective agent to a general agent.

The disclosed system and method automatically identify and rank successful agents and/or active agents, thereby assisting the recruitment process and the career development of agents.

In one embodiment, a computer-implemented method comprises retrieving, by a profile analyzer module of an analytics engine server, a profile record and related data associated with an active agent from an internal database; providing, by an attributes analyzer module of the analytics engine server, a key attribute for predicting a likelihood of success for a prospective or current agent; comparing, by a profile analyzer of the analytics engine server, the profile record of the active agent with key attributes by applying an algorithm based on the key attribute; assigning, by the profile analyzer of the analytics engine server, a validation score for the profile record of the active agent compared with each key attribute, wherein the validation score is based upon whether the profile record satisfies a predetermined criteria for the key attribute; estimating, by a ranking module of the analytics engine server, a weighted coefficient for the profile record based on the validation score, wherein the weighted coefficient is a summation of validation scores for the comparison of each key attribute of the profile record of the active agent; determining, by the ranking module of the analytics engine server, whether the weighted coefficient satisfies a predetermined threshold that indicates a likelihood of success of the active agent; generating, by the ranking module of the analytics engine server, a listing of active agents having a weighted coefficient that satisfies the predetermined threshold; and marking, by the ranking module of the analytics engine server, each profile record of active agents that do not have a weighted coefficient that satisfies the predetermined threshold.

In another embodiment, a system comprises retrieving, by a profile analyzer module of an analytics engine server configured to retrieve a profile record and related data associated with an active agent from an internal database; providing, by an attributes analyzer module of the analytics engine server configured to provide a key attribute for predicting a likelihood of success for a prospective or current agent; comparing, by a profile analyzer of the analytics engine server configured to compare the profile record of the active agent with key attributes by applying an algorithm based on the key attribute, and configured to assign a validation score for the profile record of the active agent compared with each key attribute, wherein the validation score is based upon whether the profile record satisfies a predetermined criteria for the key attribute; and estimating, by a ranking module of the analytics engine server configured to estimate a weighted coefficient for the profile record based on the validation score, wherein the weighted coefficient is a summation of validation scores for the comparison of each key attribute of the profile record of the active agent, configured to determine whether the weighted coefficient satisfies a predetermined threshold that indicates a likelihood of success of the active agent, configured to generate a listing of active agents having a weighted coefficient that satisfies the predetermined threshold, and configured to mark each profile record of active agents that do not have a weighted coefficient that satisfies the predetermined threshold.

Additional features and advantages can become apparent from the detailed descriptions which follow, taken in conjunction with the accompanying drawings.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Agent" refers to an individual working for a company or as a broker with an interest in attracting new clients by analyzing their needs and wishes. An agent looks for prospects with high referral potential. In addition, an agent may represent the intermediary between an issuing company and a client.

"Analytics engine" refers to a software module that handles data integration; breaks data streams into atomic parts, executes rules, and performs data matching by using fuzzy logic, among others.

"Attributes" refers to one or more characteristics that may be relevant for evaluating the performance of agents.

"General agent" refers to an individual who supervises the work of agents and may be in charge of their recruitment and training.

"Metadata" refers to analyzed data that can be used for creating a potential agent profile.

Figure 1:
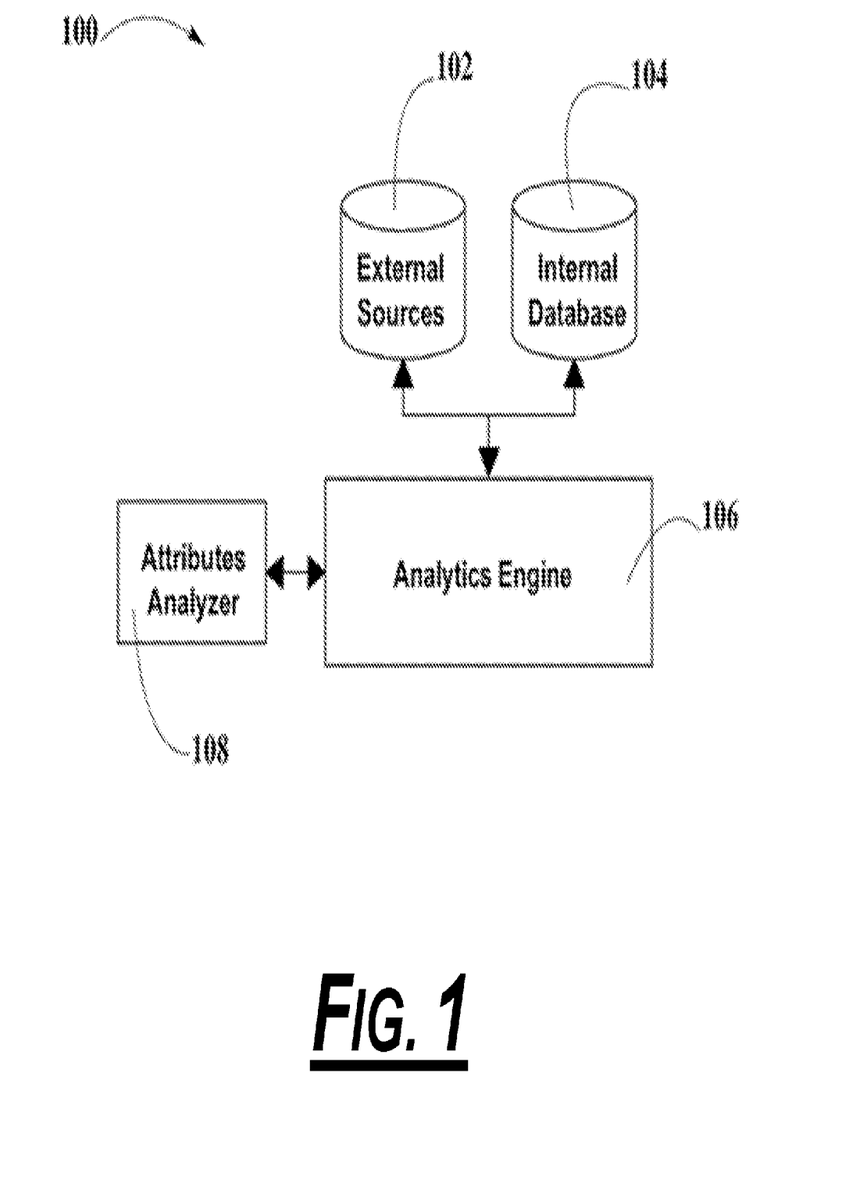
FIG. 1 is a block diagram illustrating an exemplary system architecture for identifying prospective agents, according to an embodiment.

FIG. 1 is a block diagram illustrating an exemplary system architecture for identifying and ranking prospective agents according to an embodiment. In FIG. 1, system architecture 100 includes external database 102, internal database 104, analytics engine 106, and attributes analyzer 108. In other embodiments, system architecture 100 includes additional, fewer, different, or differently arranged components than those illustrated in FIG. 1.

In FIG. 1, analytics engine 106 is wired/wirelessly coupled to and in wired/wireless communication with external database 102, and is additionally wired/wirelessly coupled to and in wired/wireless communication with internal database 104. In this embodiment, analytics engine 106 is wired/wirelessly coupled to and in wired/wireless communication with attributes analyzer 108. In FIG. 1, the network connection (not shown in the FIG. 1) permits components within system architecture 100 to communicate with each other. Examples of network connections are intranets, local area networks (LAN), virtual private networks (VPN), wireless area networks (WAN) and the internet among others.

In some embodiments, external database 102 stores information such as resumes, job history, recommendations, and social activities outside the work environment, among others. In these embodiments, external database 102 can be fed from websites, social media and networks, and referrals, among others. In one embodiment, information stored in external database 102 is supplied by recruitment or job agencies. In another embodiment, external database 102 is implemented through database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that organizes collections of data.

In some embodiments, internal database 104 stores profiles and data associated with one or more active agents in the financial or insurance company. In these embodiments, active agents are considered current workers of the financial or insurance company who have dedicated profiles.

In a further embodiment, analytics engine 106 includes a processing unit for executing algorithms or computer-executable program instructions. In these embodiments, the processing unit may include a processor with computer-readable medium, such as a random access memory (RAM) (not shown) coupled to the processor. Examples of processor types include a microprocessor, application specific integrated circuit (ASIC), and field programmable object array (FPOA), among others.

In some embodiments, attributes analyzer 108 includes a processing unit for executing algorithms or computer-executable program instructions. In these embodiments, attributes analyzer 108 provides key attributes for predicting the likelihood of success for potential and current agents. Examples of key attributes include knowledge of the products to offer, university education and related professional licenses, people and communication skills, accessibility, intelligence quotient, personality, quality of service provided to clients, experience, and periodic evaluation reports, among others.

In some embodiments, analytics engine 106 is configured to retrieve information about external agents from external database 102 and coverts the data extracted from external database 102 into one or more agents' profiles. In these embodiments, an agent profile includes university education, communication skills, experience, resume, creativity and analytical skills, among others According to some embodiments, analytics engine 106 also retrieves from internal database 104, profiles and other data associated with active agents within the financial or insurance company. In some embodiments, analytics engine 106 retrieves key attributes from attributes analyzer 108, where each key attribute has a validation score based on a satisfying set of predetermined criteria.

In another embodiment, analytics engine 106 uses an algorithm to compare an agent profile with key attributes retrieved from attributes analyzer 108. Analytics engine 106 assigns a validation score to each key attribute found within the agent profile. Analytics engine 106 obtains a weighted coefficient based on the weight of each validation score found within the agent profile and associates the weighted coefficient with the agent profile. The weighted coefficient may be a summation of the validation scores for each key attribute found in the agent profile. This process will be repeated for each agent profile from external database 102 and internal database 104. Subsequently, analytics engine 106 determines whether each agent profile satisfies one or more success criteria using the weighted coefficient associated with each agent profile. If the agent profile satisfies the success criteria, then analytics engine 106 ranks the agent profile and adds the agent profile to a list of potentially successful agents. Otherwise the agent profile is discarded. This process is repeated with all the agents' profiles. In some embodiments, the success criteria include a combination of metrics and/or goals that can be used for evaluating the performance and success of agents. The success criteria can vary according to internal business and human development considerations of the insurance or financial company, and it can also consider external factors such as market performance and competition.

In some embodiments, analytics engine 106 generates a list of potentially successful agents using information from one or more agent's profiles within external database. In these embodiments, analytics engine 106 ranks the potential agent's profile based on the weighted coefficient associated with each agent profile. In this embodiment, one or more general agents use this list of identified potential agents to expand operations and coverage, renew personnel, develop new products, and improve customer service, among other business activities.

In another embodiment, analytics engine 106 generates a list of potentially successful agents using information from active agents within external database 102 and internal database 104. In these embodiments, analytics engine 106 ranks the successful agents profile based on the weighted coefficient associated with each agent profile. Furthermore, analytics engine 106 sends periodic ranking reports or performance assessment reports to one or more general agents. In some embodiments, general agents use these ongoing assessment reports of current agents for evaluating and following up their career developments.

In a further embodiment, analytics engine 106 matches the attributes of the identified potentially successful agents to the profiles of one or more general agents. For example, analytics engine 106 determines that certain potentially successful agents may be best suited for working with a particular general agent covering a region that includes clients with more complex or sophisticated needs. Analytics engine 106 sends a list of identified successful agents to one or more agent computing devices. In this embodiment, one or more general agents use this list of identified successful agents to expand operations and coverage, renew personnel, develop new products, and improve customer service, among other business activities.

In some embodiments, an application of the system described in FIG. 1 is used by an insurance or financial company that needs to hire new agents. The insurance or financial company may use the system described in FIG. 1 to determine prospective agents based on key attributes or success factors thereby assisting the career development of agents and the recruitment process.

Figure 2:
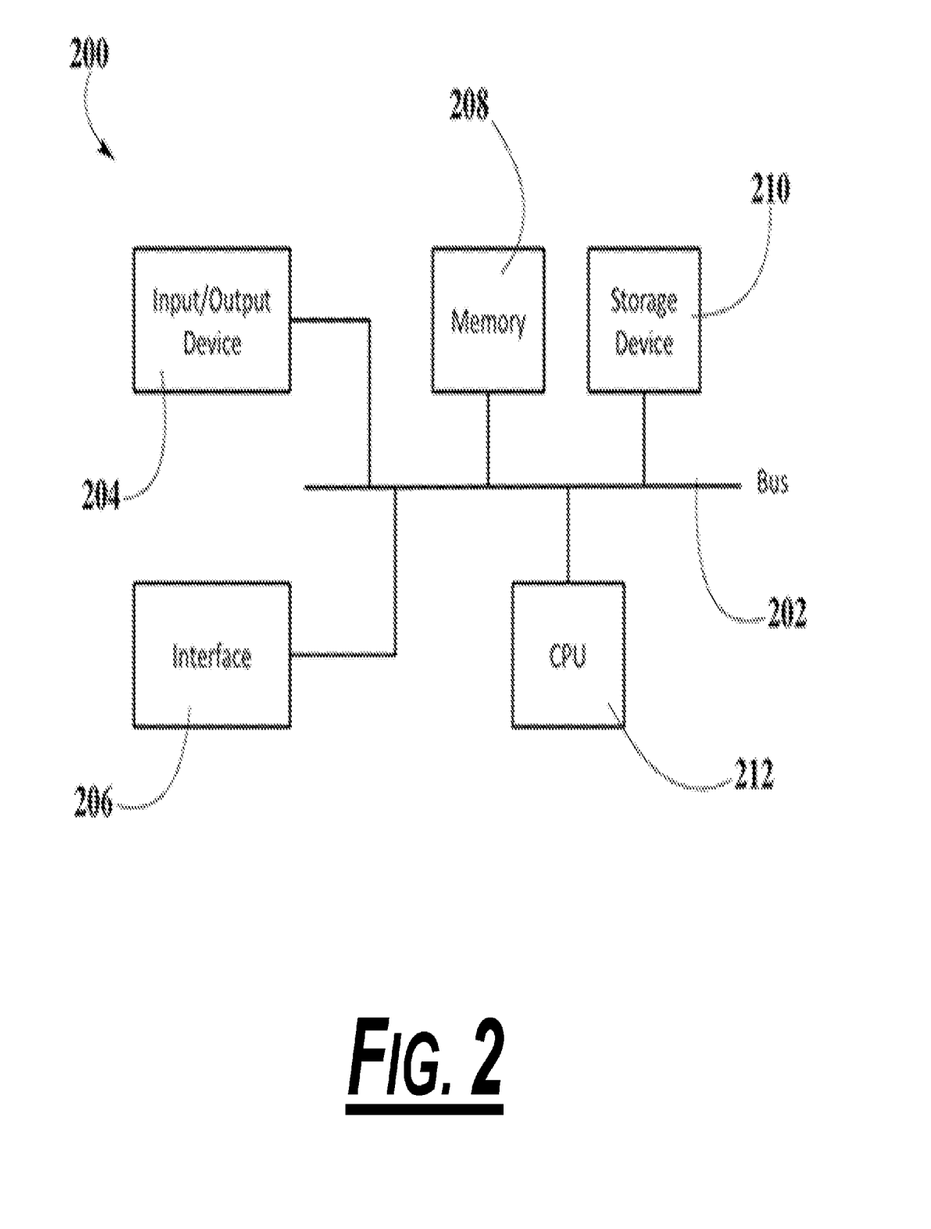
FIG. 2 is block diagram illustrating an exemplary computing device or server in which one or more embodiments of the present disclosure may operate.

FIG. 2 is a block diagram illustrating an exemplary computing device in which one or more embodiments of the implementation may operate. In FIG. 2, computing Device 200 includes Bus 202, input/output (I/O) Device 204, communication Interface 206, Memory 208, Storage Device 210 and Central Processing Unit 212. In another embodiment, Computing Device 200 includes additional, fewer, different, or differently arranged components than those illustrated in FIG. 2.

In FIG. 2, Bus 202 is in physical communication with (I/O) Device 204, Communication Interface 206, Memory 208, Storage Device 210, and Central Processing Unit 212. Bus 202 includes a path that permits components within Computing Device 200 to communicate with each other. Examples of (I/O) Device 204 include peripherals and/or other mechanisms that may enable an examiner or candidate to input information to Computing Device 200, including a keyboard, computer mice, buttons, touch screens, touchpad, voice recognition, biometric mechanisms, and the like. (I/O) Device 204 also includes a mechanism that outputs information to a user of Computing Device 200, such as, for example a display, a microphone, a light emitting diode (LED), a printer, a speaker, orientation sensors and the like. Said orientation sensors include one or more accelerometers, one or more gyroscopes, one or more compasses, and the like.

Examples of Communication Interface 206 include mechanisms that enable Computing Device 200 to communicate with other computing devices and/or systems through network connections. Examples of Memory 208 include random access Memory 208 (RAM), read-only memory (ROM), flash memory, and the like. Examples of Storage Device 210 include magnetic and/or optical recording medium, ferro-electric RAM (F-RAM) hard disks, solid-state drives, floppy disks, optical discs, and the like. In one embodiment, Memory 208 and Storage Device 210 store information and instructions for execution by Central Processing Unit 212. In another embodiment, Central Processing Unit 212 includes a microprocessor, an application specific integrated circuit (ASIC), or a field programmable object array (FPOA), and the like. In this embodiment, Central Processing Unit 212 interprets and executes instructions retrieved from Memory 208 and Storage Device 210.

Examples of these implementations include servers, authorized computing devices, smartphones, desktop computers, laptop computers, tablet computers, PDAs, and any other type of processor-controlled device that may receive, process, transmit digital data, and the like. Additionally, Computing Device 200 may perform certain operations that are required for the proper operation of system architecture 100. Computing Devices 200 may perform these operations in response to Central Processing Unit 212 executing software instructions contained in a computer-readable medium, such as Memory 208.

In one embodiment, the software instructions of a system are read into Memory 208 from another memory location, such as Storage Device 210, or from another Computing Device 200 via communication Interface 206. In this embodiment, the software instructions contained within Memory 208 cause Central Processing Unit 212 to perform processes that will be described in FIG. 3, below.

Figure 3:
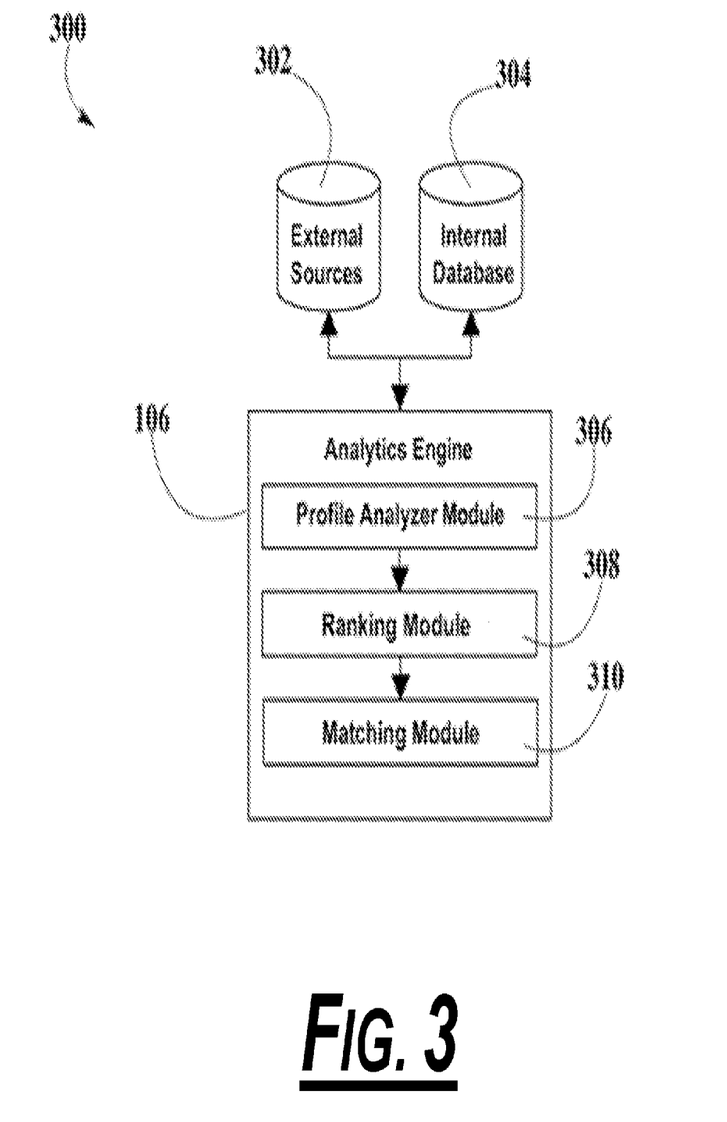
FIG. 3 is a block diagram illustrating an exemplary subsystem of a portion of a system architecture pertaining to an analytics engine, according to an embodiment.

FIG. 3 is a block diagram illustrating an exemplary sub-system of a portion of system architecture 100 of FIG. 1. In some embodiments, sub-system 300 is implemented as an analytics engine, such as, for example analytics engine 106. In FIG. 3 sub-system 300 includes an external database 302, an internal database 304, and analytics engine 106. Analytics engine 106 further includes a profile analyzer module 306, a ranking module 308 and a matching module 310. It should be understood that analytics engine 106, can include less components, more components, or different components depending on the desired analysis goals. In an example referring to FIG. 1, analytics engine 306 is implemented as analytics engine 106 within system architecture 100.

In FIG. 3, analytics engine 106 is wired/wirelessly coupled to and in wired/wireless communication with external database 302. Analytics engine 106 is additionally wired/wirelessly coupled to and in two-way wired/wireless communication with internal database 304. Profile analyzer module 306 within analytics engine 106, is wired/wirelessly coupled to and in wired/wireless communication with identification module 308. In FIG. 3, the network connection (not shown in FIG. 3) permits components within subsystem 300 to communicate with each other. Examples of network connections may be intranets, local area networks (LAN), virtual private networks (VPN), wireless area networks (WAN) and the internet among others.

In some embodiments, analytics engine 106 includes a processing unit for executing algorithms or computer-executable program instructions related to the operation of profile analyzer module 306, ranking module 308 and matching module 310. In one embodiment, each software module includes a separate processing unit for running related algorithms or computer executable program instructions. The processing unit includes a processor with a computer-readable medium, such as a random access memory (RAM) (not shown) coupled to the processor. Examples of processor types include a microprocessor, application specific integrated circuit (ASIC), and field programmable object array (FPOA), among others.

In some embodiments, profile Analyzer module 306 is configured to retrieve information about external agents from external database 302 and convert the data extracted from external database 302 into one or more agent profiles. In these embodiments, an agent profile includes university education, communication skills, experience, resume, creativity, analytical skills among others. According to some aspects of this embodiment, profile Analyzer module 306 also retrieves, from internal database 304, profiles and related data of active agents from the financial or insurance company. In some embodiments, profile Analyzer module 306 retrieves key attributes from an attributes analyzer (not shown in FIG. 3), where each key attribute has a validation score based on a satisfying set of predetermined criteria. In another embodiment, profile analyzer module 306 uses an algorithm to compare an agent profile with key attributes retrieved from the attributes analyzer. Profile analyzer module 306 assigns a validation score to each key attribute found within the agent profile. Validation scores can vary from 1-5 based on a satisfying set of predetermined criteria.

According to some aspects of this embodiment, ranking module 308 obtains a weighted coefficient based on the weight of each validation score found within the agent profile and associates the weighted coefficient with the agent profile. The weighted coefficient can be a summation of the validation scores assigned to each key attribute found in the agent profile. This process will be repeated for each agent profile from external database 302 and internal database 304. Subsequently, ranking module 308 determines if the agent profile satisfies one or more success criteria using the weighted coefficient associated with each agent profile. If the agent profile satisfies the success criteria, then identification module 308 ranks the agent profile and adds the agent profile to a list of successful agents. Otherwise the agent profile is discarded. This process is repeated with all the agents' profiles from external database 302 and internal database 304. Finally, identification module 308 generates a list of potentially successful agents, where successful agents are ranked based on the weighted coefficient associated with each agent profile. In some embodiments, the success criteria include a combination of metrics and/or goals that can be used for evaluating the performance and success of agents. The success criteria can vary according to internal business and human development considerations of the insurance or financial company, and it may also consider external factors such as market performance and competition.

In some embodiments, ranking module 308 generates a list of potentially successful agents using information from agent's profiles within external database 302. In these embodiments, ranking module 308 ranks the potential agent's profiles based on the weighted coefficient associated with each agent profile. In this embodiment, one or more general agents use this list of identified potential agents to expand operations and coverage, renew personnel, develop new products, and improve customer service, among other business activities.

In another embodiment, ranking module 308 generates a list of potentially successful agents using information from active agents within external database 302 and internal database 304. In these embodiments, ranking module 308 ranks the successful agent's profiles based on the weighted coefficient associated with each agent profile. Furthermore, ranking module 308 sends periodic ranking reports or performance assessment reports to one or more general agents. In some embodiments, general agents use these ongoing assessment reports of current agents for evaluating and following up their career developments.

In a further embodiment, matching module 310 matches the attributes of the identified potentially successful agents to the profiles of one or more general agents. For example, matching module 310 determines that certain potentially successful agents may be best suited for working with a particular general agent covering a region that includes clients with more complex or sophisticated needs. Matching module 310 sends a list of identified successful agents to one or more agent computing devices. In this embodiment, one or more general agents use this list of identified successful agents to expand operations and coverage, renew personnel, develop new products, and improve customer service, among other business activities.

Figure 4:
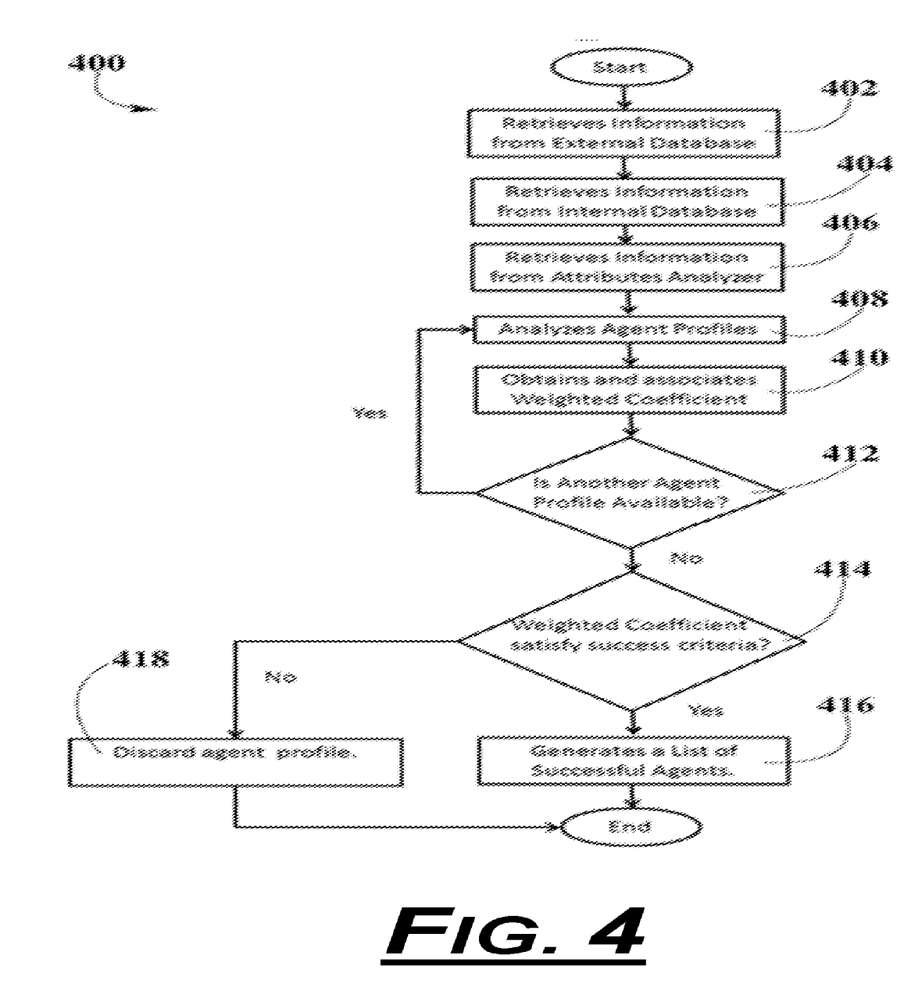
FIG. 4 is an exemplary flowchart generally illustrating a method to predict successful agents, according to an embodiment.

FIG. 4 is an exemplary flowchart generally illustrating a method 400 for identifying successful agents. A plurality of steps included in method 400 may be performed by one or more computing devices such as computing device 200 implementing/running one or more software modules of the exemplary operating environments of FIGS. 1-3. The steps of this exemplary method are embodied in a computer readable medium containing a computer readable code such that the steps are implemented when the computer readable code is executed by a computing device. In some implementations, certain steps of the method can be combined, performed simultaneously, or in a different order, without deviating from the objective of the method.

In FIG. 4, method 400 starts at step 402 when a profile analyzer within an analytics engine retrieves information about prospective agents from an external database. Examples of external data sources include websites, social media and referrals, among others. Information that can be gathered from external data sources includes resumes, job history, recommendations, demographics, social and behavioral data, among others. In some embodiments, the profile analyzer coverts the data extracted from the external database into one or more agent profiles. Method 400 advances to step 404.

At step 404, the profile analyzer retrieves, from an internal database, profiles and related data associated with active agents from a financial or insurance company. In some embodiments, the internal database includes information about active agents such as performance or historical sales data Method 400 advances to step 406.

At step 406, an attributes analyzer module feeds the analytics engine with one or more key attributes or success factors used for predicting the likelihood of success for prospective and current agents. Examples of key attributes or success factors include knowledge of the products to offer, college education and related professional licenses, people and communication skills, accessibility, intelligence quotient, personality, technical abilities, quality of service provided to clients, and experience, among others. Method 400 advances to step 408.

At step 408, a profile analyzer module uses an algorithm to compare agent profiles with key attributes. In this embodiment, the profile analyzer module assigns a validation score to each key attribute found within the agent profile. Further to this embodiment, the validation score is computed based on a particular key attribute reaching a predetermined criteria. For example, for a key attribute related to IQ, the validation score assigned to the agent profile may be higher if the IQ of the agent is close to a predetermined criteria of 140. Method 400 advances to step 410.

At step 410, a ranking module estimates a weighted coefficient based on the validation score found within the agent profile. In some embodiments, the ranking module associates this weighted coefficient with the agent profile. The weighted coefficient is a summation of the validation scores for each key attribute found in the agent profile. Method 400 advances to step 412.

At step 412, the ranking module checks if there is any other agent profile that needs to be weighted according the validation scores. In one embodiment, if there are more agent profiles to be weighted, then method 400 advances to step 408. In another embodiment, if there are no more agent profiles to be weighted, then method 400 advances to step 414.

At step 414, the ranking module checks if the weighted coefficient computed for the agent profile satisfies one or more success criteria. In some embodiments, the weighted coefficient varies according to logic variables, analog logic, digital inputs and rule based values, among others. According to some aspects of this embodiment, the success criteria include a combination of metrics, thresholds, and/or goals that can be used for evaluating the performance and success of agents. The success criteria vary according to internal business and human development considerations of the insurance or financial company. In one embodiment, if the weighted coefficient of the agent profile satisfies the success criteria or threshold, then method 400 advances to step 416. In another embodiment, if the weighted coefficient of the agent profile does not satisfy the success criteria or threshold, then method 400 advances to step 418. In this embodiment, step 414 is repeated with all the agents' profiles from external database and internal database.

At step 416, the ranking module adds the agent profile that satisfied the success criteria or threshold to a list of potential agents. At step 418, the ranking module discards the agent profile that does not satisfy the success criteria or threshold.

By executing method 400 through the exemplary operating environments shown in FIGS. 1-3, big data analytics and data mining techniques can be implemented for a more efficient and faster processing of larger data sets. In this way, efficiencies are created by providing the financial or insurance company with ways to identify and rank successful agents. These features allow performing large work such as heavy calculations and time consuming analysis in a more efficient manner than other approaches such as manual work performed by humans.

Figure 5:
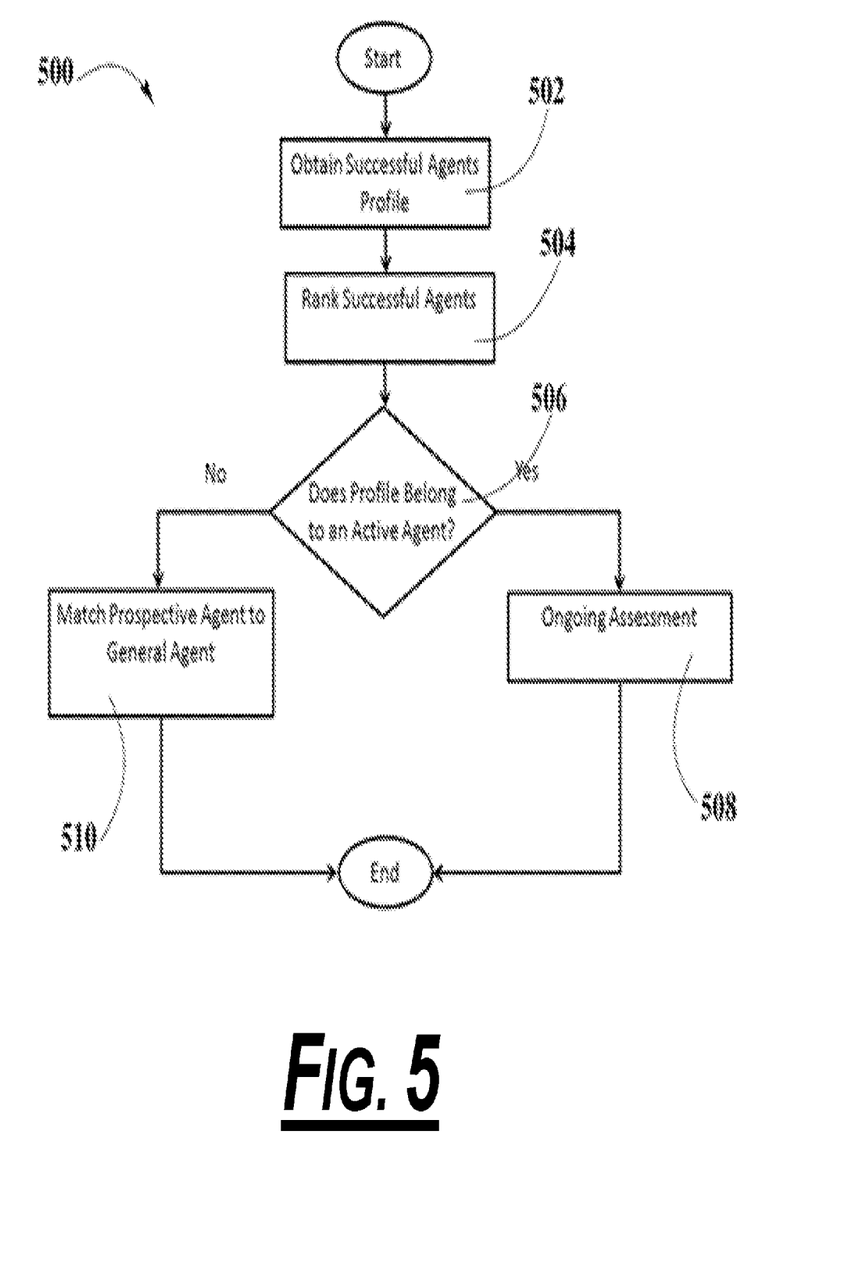
FIG. 5 is an exemplary flowchart generally illustrating a method to provide prospective agents to general agents, according to an embodiment.

FIG. 5 is an exemplary flowchart generally illustrating a method 500 for matching prospective agents to general agents, according to an embodiment. A plurality of steps included in method 500 may be performed by one or more computing devices such as computing device 200 implementing/running one or more software modules of the exemplary operating environments of FIGS. 1 and 3. The steps of this exemplary method are embodied in a computer readable medium containing a computer readable code such that the steps are implemented when the computer readable code is executed by a computing device. In some implementations, certain steps of the method can be combined, performed simultaneously, or in a different order, without deviating from the objective of the method.

In FIG. 5, the method starts at step 502, when a ranking module generates a list of prospective successful agents. In some embodiments, the list of successful agents can be generated from the analysis of agent profiles obtained from an external database and an internal database as described in FIG. 4. In these embodiments, the list of successful agents includes active or prospective agents. Method 500 then advances to step 504.

At step 504, the ranking module ranks successful agent profiles from the list created at step 502. In one embodiment, this ranking is based on a weighted coefficient associated with each successful agent profile. In this embodiment, the weighted coefficient is a summation of the validation scores assigned for each key attribute found in successful agent profiles. Method 500 then advances to step 506.

At step 506, a matching module determines whether the agent profile within the list of successful agents is an active agent within the financial or insurance company. In this embodiment, active agents are considered current workers of the financial or insurance company. In one embodiment, if the agent profile is an active agent, then method 500 advances to step 508. In another embodiment, if the agent profiles is not an active agent, then method 500 advances to step 510.

At step 508, the matching module sends periodic ranking reports or performance assessment reports of active agents to one or more general agents. In some embodiments, general agents use these ongoing assessment reports of active agents for evaluating and following up their career developments.

At step 510, the matching module matches the attributes of the identified potentially successful agents to the profiles of one or more general agents. In some embodiments the matching module determines that certain prospective successful agents may be best suited for working with a particular general agent covering a region that includes clients with more complex or sophisticated needs. In one example, the matching module determines that successful agents having a university degree from an Ivy School may be best suited for working with a general agent from Massachusetts or New York. In another example, the matching module determines that successful agents having life science backgrounds may be best suited for working with a general agent focusing on health insurance. Yet in another example, the matching module determines that successful agents fluent in Spanish may be best suited for working with a general agent covering a region with a high percentage of Hispanic population.

In these embodiments, matching module sends a list of identified successful agents to one or more agent computing devices. Further to these embodiments, one or more general agents can use the list of identified successful agents to expand operations and coverage, renew personnel, develop new products, and improve customer service, among other business activities.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be used in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and5 novel features disclosed herein.

What is claimed is:

1. A computer-implemented method comprising:

executing, by a server, an algorithm based on a plurality of key attributes for predicting a likelihood of success for an active agent, wherein the algorithm compares a profile record of each agent of a plurality of agents with each key attribute, wherein the profile record for each of the plurality of agents identifies the agent as an active agent, a prospective agent, or a general agent assigned to supervise a plurality of active agents;

outputting, by the server from the algorithm, a validation score for the profile record of each active agent compared with each key attribute, wherein the validation score is based upon whether the profile record satisfies a predetermined criterion for each key attribute;

generating, by the server, a weighted coefficient for each profile record based on the validation score, the weighted coefficient indicating a likelihood of success and corresponding to a summation of validation scores for the comparison of each key attribute of the profile record of each active agent;

identifying, by the server, a first agent from the plurality of agents as an active agent having a weighted coefficient that satisfies a first predetermined threshold;

identifying, by the server, a second agent from the plurality of agents as a prospective agent, the second agent having at least one attribute matching with at least one key attribute of the first agent, wherein the at least one attribute corresponds to a profile of a general agent from the plurality of agents; and transmitting, by the server, an electronic notification to an electronic device operated by the general agent, the electronic notification comprising identification of the first agent, identification of the second agent, and the at least one attribute corresponding to the profile of the general agent.

2. The method of claim 1, wherein the algorithm is generated based on historical performance data of active agents.

3. The method of claim 1, wherein the key attribute includes at least one of knowledge of products to offer, college education, professional license, communication skills, accessibility, intelligence quotient, personality, technical ability, quality of client service, and experience.

4. The method of claim 1, further comprising generating, by the server, a ranking report of the plurality of active agents based upon their respective weighted coefficient.

5. The method of claim 1, wherein the profile record comprises data populated from an internal database or external data source.

6. The method of claim 1, wherein the profile record comprises data populated from a social networking data source.

7. The method of claim 1, further comprising:
displaying, by the server, at the electronic device operated by the general agent a listing of each active agent having a weighted coefficient that satisfies the first predetermined threshold.

8. The method of claim 1, further comprising:
generating, by server, an estimated weighted coefficient for a profile record based on the validation score.

9. The method of claim 1, wherein the server automatically identifies one or more active profiles associated with one or more active agent and identifies a weighted coefficient for each identified profile.

10. A computer system comprising:
an analytics engine server comprising:
a profile analyzer configured to:
execute an algorithm based on a plurality of key attributes for predicting a likelihood of success for an active agent, wherein the algorithm compares a profile record of each agent of a plurality of agents with each key attribute, wherein the profile record for each of the plurality of agents identifies the agent as an active agent, a prospective agent, or a general agent assigned to supervise a plurality of active agents;

output, from the algorithm, a validation score for the profile record of each active agent compared with each key attribute, wherein the validation score is based upon whether the profile record satisfies a predetermined criteria for each key attribute;

generate a weighted coefficient for each profile record based on the validation score, the weighted coefficient indicating a likelihood of success and corresponding to a summation of validation scores for the comparison of each key attribute of the profile record of each active agent; and a ranking module configured to:
identify a first agent from the plurality of agents as an active agent having a weighted coefficient that satisfies a first predetermined threshold;

identify a second agent from the plurality of agents as a prospective agent, the second agent having at least one attribute matching with at least one key attribute of the first agent, wherein the at least one attribute corresponds to a profile of a general agent; and transmit an electronic notification to an electronic device operated by the third agent, the electronic notification comprising identification of the first agent, identification of the second agent, and the at least one attribute corresponding to the profile of the general agent.

11. The system of claim 10, wherein the algorithm is generated based on historical performance data of active agents.

12. The computer system of claim 10, wherein the key attribute includes at least one of knowledge of products to offer, college education, professional license, communication skills, accessibility, intelligence quotient, personality, technical ability, quality of client service, and experience.

13. The computer system of claim 10, further comprising generating, by the server, a ranking report of the plurality of active agents based upon their respective weighted coefficient.

14. The computer system of claim 10, wherein the profile record comprises data populated from an internal database or external data source.

15. The computer system of claim 10, wherein the profile record comprises data populated from a social networking data source.

16. The computer system of claim 10, wherein the ranking module is further configured to:
display a listing of each active agent having a weighted coefficient that satisfies the first predetermined threshold.

17. The computer system of claim 10, wherein the ranking module is further configured to:
generate an estimated weighted coefficient for a profile record based on the validation score.

18. The computer system of claim 10, wherein the server automatically identifies one or more active profiles associated with one or more active agent and identifies a weighted coefficient for each identified profile.

19. A computer-implemented method comprising:
executing, by a server, an algorithm based on a plurality of key attributes for predicting a likelihood of success for an active agent, wherein the algorithm compares a profile record of each agent of a plurality of agents with each key attribute, wherein the profile record for each of the plurality of agents identifies the agent as an active agent, a prospective agent, or a general agent assigned to supervise a plurality of active agents;

outputting, by the server from the algorithm, a validation score for the profile record of each active agent compared with each key attribute, wherein the validation score is based upon whether the profile record satisfies a predetermined criterion for each key attribute;

generating, by the server, a weighted coefficient for each profile record based on the validation score, the weighted coefficient indicating a likelihood of success and corresponding to a summation of validation scores for the comparison of each key attribute of the profile record of each active agent;

identifying, by the server, a first agent from the plurality of agents as an active agent having a weighted coefficient that satisfies a first predetermined threshold;

identifying, by the server, a second agent from the plurality of agents as a prospective agent, the second agent having at least one attribute matching with at least one of the plurality of key attributes for predicting a likelihood of success for an active agent, wherein the at least one attribute corresponds to a profile of a general agent from the plurality of agents and corresponds to operations covered by the general agent; and transmitting, by the server, an electronic notification to an electronic device operated by the general agent, the electronic notification comprising identification of the first agent, identification of the second agent, and the at least one attribute corresponding to the profile of the general agent and the operations covered by the general agent.

* * * * *